United States Patent [19]

Leete

[11] 4,177,507
[45] Dec. 4, 1979

[54] METHOD AND CONTROL FOR MAINTAINING OPTIMUM PERFORMANCE OF HVDC POWER TRANSMISSION SYSTEMS AT RECTIFIER END DURING A. C. SYSTEM FAULT

[75] Inventor: Bernard D. Leete, Newtown Square, Pa.

[73] Assignee: General Electric Company, Philadelphia, Pa.

[21] Appl. No.: 889,157

[22] Filed: Mar. 22, 1978

[51] Int. Cl.$^2$ ............................................ H02M 7/155
[52] U.S. Cl. ....................................... 363/51; 363/54; 363/87
[58] Field of Search ................................... 363/51–54, 363/84–87

[56] References Cited

U.S. PATENT DOCUMENTS

| | | | |
|---|---|---|---|
| 3,466,525 | 9/1969 | Ainsworth | 363/78 |
| 3,582,755 | 6/1971 | Liss | 363/87 |
| 3,648,148 | 3/1972 | Bechet | 363/87 |
| 3,701,938 | 10/1972 | Chadwick | 363/51 |
| 3,832,620 | 8/1974 | Pollard | 363/79 |
| 3,863,134 | 1/1975 | Pollard | 363/87 X |

OTHER PUBLICATIONS

"A Refined HVDC Control System," Ake Ekstrom & Gote Liss, IEEE Transactions on Power Apparatus & Systems, No. 5/6, May, Jun. 1970, pp. 723–732.
"Comparison of Suitable Control Systems for HVDC Stations Connected to Weak AC Systems," Part I–New Control Systems and Part II–Operational Behavior by Eckhard Rumpf & S. Ranade Paper, 71TP640–PWR, Presented at IEEE Summer Meeting and Intersymposium on High Power Testing, Portland, Oregon, Jul. 18–23, 1971, pp. 549–564.

Primary Examiner—William M. Shoop
Attorney, Agent, or Firm—William Freedman; Carl L. Silverman

[57] ABSTRACT

A new and improved control subassembly for HVDC power converters and method of its use during transient faults affecting the A. C. system employed in the HVDC power transmission system to assure the presence of adequate firing and commutating voltages across the respective HVDC thyristor valves during selected intervals of the alternating current periods of the respective phases. The HVDC power converters used in the system include gating circuits for gating-on respective ones of the thyristor valves during selected intervals of the alternating current periods of the respective phases. The gating circuits include equidistant-spaced gate firing pulse generating circuits for supplying equidistant-spaced gating-on firing pulses to the gate drives for the respective HVDC thyristor valves of the HVDC bridge power converter during normal operation of the converter in the presence of symetrically-shaped A. C. system voltage waveforms. The gating circuit further includes firing mode switch circuits connected intermediate the equidistant-spaced gate firing pulse generators and the gate drives for the respective HVDC thyristor valves. The firing mode switch circuits are supplied with the outputs from an A. C. system monitor for reducing and monitoring the voltage waveshapes of the A. C. system voltage for detecting the points at which the respective phase voltages of the multi-phase alternating current system pass through zero voltage value in a direction which enables the respective associated HVDC valves for conduction and for deriving output commutating voltage indicating signals representative of this occurrence. A minimum valve voltage detector also is coupled to the A. C. system for sensing that any of the A. C. system phase voltages are below a predetermined minimum safe level required to assure safe operation of the HVDC power converters and derives an output minimum valve voltage alarm signal under conditions where the minimum safe level has not been attained by the voltage across any one of the HVDC thyristor valves. The minimum valve voltage alarm signal is utilized to control the firing mode switch circuits in such a manner that the commutating voltage waveform signals for the respective phases from the output of the A. C. system monitor after suitable signal processing is used to drive the gate drives for the respective HVDC thyristor valves in the presence of a minimum valve voltage alarm signal in place of the normal equidistant-spaced gating-on firing pulses under conditions where asymmetries occur in the A. C. system voltage waveforms due to transient disturbances affecting the system. Upon termination of the fault, the minimum valve voltage alarm signal terminates and the system returns to normal with the HVDC thyristor valves being gated-on by the equidistant-spaced firing pulses.

21 Claims, 7 Drawing Figures

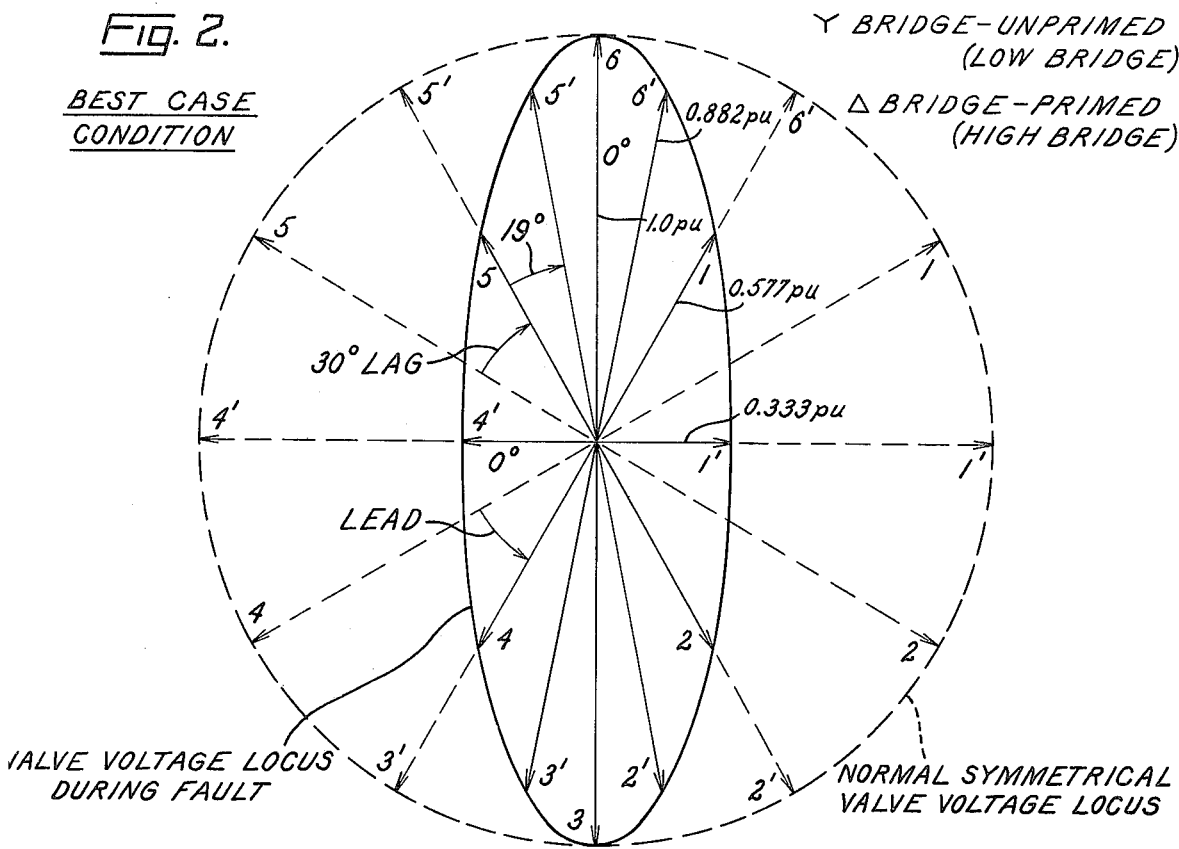
12 PULSE CONVERTER DURING SINGLE PHASE CLOSE-BY FAULT
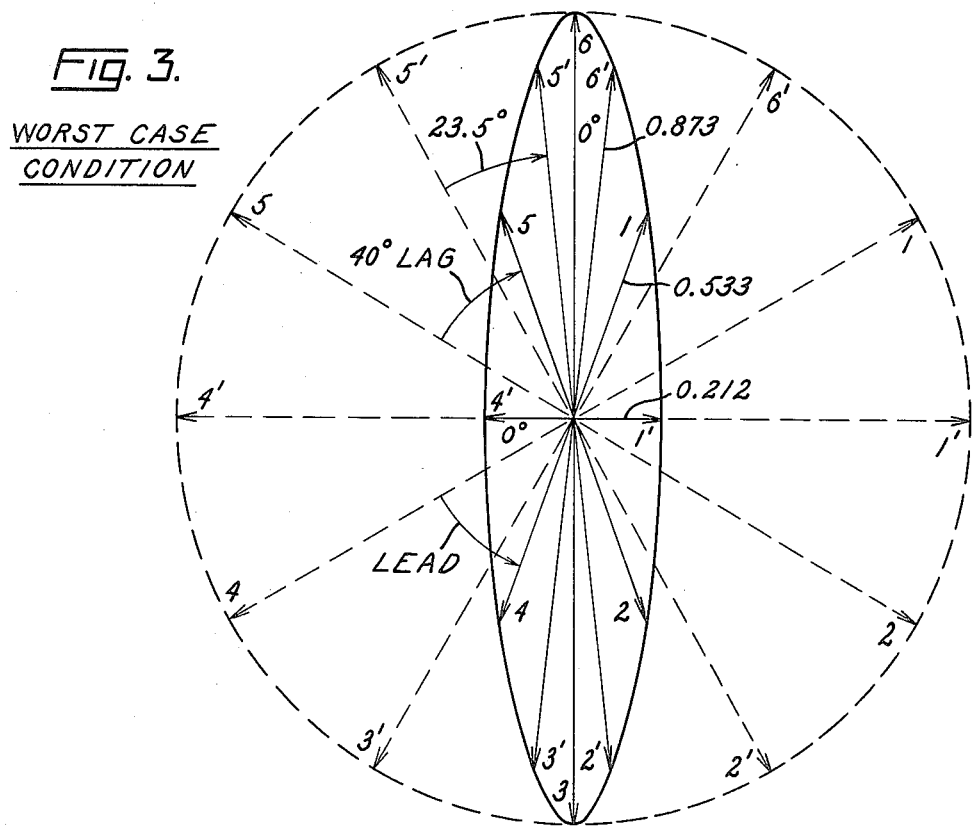

VALVE VOLTAGES DURING SINGLE-PHASE A.C. FAULT

METHOD AND CONTROL FOR MAINTAINING OPTIMUM PERFORMANCE OF HVDC POWER TRANSMISSION SYSTEMS AT RECTIFIER END DURING A. C. SYSTEM FAULT

BACKGROUND OF INVENTION

1. Field of Invention

This invention relates to high voltage direct current (HVDC) power transmission systems.

More specifically, the invention relates to a new and improved control for HVDC power converters and method of using the same for optimizing power transfer through HVDC power transmission systems from the rectifier end during both normal operating conditions and in the presence of a severe A.C. system fault.

2. Background Problem

U.S. Pat. No. 3,701,938 issued Oct. 31, 1972 for a "Minimum Valve Voltage Method and Control Apparatus For HVDC Power Converters" assigned to the General Electric Company, describes a known form of control technique and apparatus for assuring that a minimum valve voltage exists across the thyristor valve of the HVDC power converter in advance of supplying gating-on firing pulse signals to the gate drive of the thyristors. The control described in U.S. Pat. No. 3,701,938, upon a disturbance occurring on the A.C. supply system of the HVDC power transmission system, operates to immediately drive the minimum firing angle $\alpha_{min}$ out to some increased angle of delay that is designed to be sufficient to assure adequate firing voltage across the thyristor valves of the power converter even in the presence of A.C. system disturbances. After the passage of the A.C. system disturbance, the control allows the $\alpha_{min}$ limit to relax back to its original minimum limit setting after some predetermined period of time gauged to allow adequate time for the A.C. system disturbance to pass and for the system to return to normal operating conditions. This known control and technique, while adequate for certain types of A.C. system disturbances, such as the appearance of undesired harmonics on the A.C. system voltage waveform, does have certain shortcomings due to its effect on system operation as explained in the following paragraphs.

There are two basic approaches in the control of the firing of HVDC power converters, and each has its advantages and disadvantages. An ideal firing system would combine the advantages of both and hopefully eliminate the disadvantages. One of these known control techniques controls the firing of each thyristor valve individually and obtains best results where the multiphase alternating current supply system voltage waveforms are not symmetrical. However, this control technique tends to generate noncharacteristic harmonics, which accentuate filtering problems in order to avoid telephonic and radio interference. Since the multi-phase A.C. supply system employed in HVDC power transmission schemes normally provides symmetrical voltage waveforms, the other basic control technique assumes a symmetrical supply system and advances or retards all firing of the HVDC thyristor valves together so as to maintain essentially equidistant-spaced intervals between conduction for the different valves.

With the equidistant-spaced firing system, some voltage normally is maintained on each valve of the power converter whether it be a six-pulse converter, a twelve-pulse converter, etc. so that the D.C. link can continue to transmit power. It is desirable that as much power as possible be transmitted in order to maintain stability of the A.C. system. However, as shown in FIGS. 2 and 3 of the drawings, with such an arrangement, the A.C. system becomes highly unsymmetrical both in magnitude and in phase in the presence of a close-by single-phase fault at the rectifier end of the HVDC power transmission system. This dis-symmetry in the A.C. system voltage waveforms is detected by a minimum valve voltage detector such as that described in the above reference U.S. Pat. No. 3,701,938, the teachings of which are hereby incorporated in their entirety by reference, which attempts to maintain operation of the system by retarding the firing angle of all of the thyristor valves. For the best case condition, as shown in FIG. 2, the firing angle for all of the valves must be retarded by at least 30°, and for the worst case situation, the firing angles must be retarded by about 40°. This resulting action on the part of the minimum firing voltage control circuit produces such a large drop in the HVDC link line voltage that only about 30% power can be transmitted under such conditions. Furthermore, this large drop in the rectifier voltage makes it probable that the converter current may fall to zero due to the discharge of the D.C. filter element employed in such HVDC transmission links. If this happens, it becomes necessary to close the by-pass switch and restart the HVDC transmission link thereby resulting in a period of several cycles when there is no power transmission. To overcome this problem, the present invention was devised.

SUMMARY OF INVENTION

It is therefore a primary object of the present invention to provide a novel control and method of its use for maintaining optimum performance and power transfer through HVDC power transmission systems during A.C. system faults affecting the rectifier end of the system.

Another object of the invention is to provide a novel control for HVDC power converters of the type normally employing equidistant-spaced firing pulses for sensing the occurrence of a nearby single phase fault in a multiphase A.C. supply system for supplying voltage across the HVDC thyristors of the power converter and which results in advancing the phase of certain of the phase voltages while retarding the phase of other of the phase voltages; and for deriving control signals for delaying the firing (gating-on) of the thyristors whose A.C. supply phase voltages are retarded and advancing the firing of thyristors whose phase voltages are advanced thereby assuring that at all times adequate voltage exists across the thyristors to assure safe turn-on and commutation off of a previously conducting thyristor while at the same time assuring maximum power transfer through the HVDC power transmission system even in the presence of severe A.C. system faults.

In practicing the invention an HVDC power converter is provided which comprises a plurality of valves connected in an HVDC bridge intermediate a multiphase alternating current system and at least one HVDC power conductor link together with gating circuit means for gating-on respective ones of said valves during selected intervals of the alternating current periods of the respective phases. The gating circuit means utilizes equidistant-spaced gate firing pulse generating means for normally supplying equidistant-spaced gating-on firing pulses to gate drive circuit means for the respective valves of the HVDC bridge power converter during normal operation of the converter in the presence of symmetrically-shaped A.C. system voltage waveforms. The improvement comprises firing mode switch means connected intermediate the equidistant-spaced gate firing pulse generating means and the gate drive means for the respective thyristors. A.C. system monitor means are coupled to the A.C. system in parallel circuit relationship with the HVDC bridge for reducing and monitoring the voltage waveshapes of the A.C. system voltage for detecting points at which the respective phase voltages of the multiphase alternating current system pass through zero voltage value in a direction which will enable the respective associated HVDC valves for conduction and for deriving output commutating voltage indicating signals indicative of this occurrence. Minimum valve voltage detector means are coupled to the A.C. system in addition to the A.C. system monitor means for sensing that any of the A.C. system phase voltages are below a predetermined minimum safe level required to assure safe operation of the HVDC power converter and for deriving an output minimum valve voltage alarm signal under conditions where the minimum safe level has not been attained by the voltage across any one of the HVDC valves. The invention further includes means for applying the output minimum valve voltage alarm signal to the firing mode switch means for controlling the operation thereof. The firing mode switch means includes means for coupling the commutating voltage indicating signals for the respective phases from the output of the A.C. system monitor means to the gate drive means for the respective HVDC valves in the presence of a minimum valve voltage alarm signal for use as gating-on firing pulses for the HVDC valves under conditions where asymmetries occur in the A.C. system voltage waveforms due to transient disturbances affecting the system. After passage of the fault, the system automatically returns to the normal equidistant-spaced firing of the HVDC valves.

With the novel HVDC power converter control described in the preceding paragraph, during certain types of A.C. system faults such as a close-by single-phase fault affecting the rectifier end of the HVDC power transmission system, the zero crossing occurrences of certain phases are delayed and the zero crossing occurrences of other phases are advanced and wherein the firing mode switch means under the control of the minimum valve voltage alarm signal assures that none of the HVDC valves are gated-on until the voltage across the respective valve is sufficient to assure safe turn-on and commutation off of a previously conducting valve thereby automatically delaying turn-on of other HVDC valves wherein the zero crossings are delayed and automatically advancing turn-on of other HVDC valves wherein the zero crossings are advanced to thereby maintain maximum power transfer through the HVDC power transmission system during transient fault conditions.

In preferred embodiments of the invention, the novel HVDC power converter includes means for delaying application of the zero crossing signals to the gate drives of the respective HVDC valves for a sufficient period to assure that the voltage across the associated HVDC valve has attained a predetermined minimum safe voltage value. Additionally, means are included for inhibiting application of the normal equidistant-spaced firing pulses to the gate drive means of the HVDC valves in response to the occurrence of the minimum valve voltage alarm signal and only the nonequidistant-spaced commutating voltage indicating signals are applied to the gate drive means for the HVDC valves as gating-on firing pulses during such A.C. system disturbances. After passage of the disturbances, the equidistant firing pulses resume control. It is also preferred that the novel power converter include output gate circuit means for selective application of HVDC valve by-pass pair formation gating signals and the like to the gate drive means of the respective HVDC valves in conjunction with either the equidistant-spaced normal gating-on firing pulses, or alternatively, the nonequidistant-spaced gating-on firing pulses derived from the zero crossing signals of the A.C. system monitor in the presence of a transient fault.

BRIEF DESCRIPTION OF DRAWINGS

These and other objects, features and many of the attendant advantages of this invention will be appreciated more readily as the same becomes better understood from a reading of the following detailed description, when considered in connection with the accompanying drawings, wherein like parts in each of the several figures are identified by the same reference character, and wherein:

FIG. 2 is a polar valve voltage amplitude versus phase diagram illustrating a best case condition for the valve voltages occurring across a twelve-pulse HVDC converter upon the occurrence of a single-phase close-by fault in a typical multiphase A.C. supply system;

FIG. 3 is polar valve voltage versus phase diagram illustrating a worse case condition for a twelve-pulse HVDC power converter during the occurrence of a single-phase close-by fault in a typical multiphase A.C. supply system;

DETAILED DESCRIPTION OF PREFERRED EMBODIMENTS

As stated earlier in the preceding discussion, for the worst case, the equidistant firing pulses supplied to the gate drive of the HVDC valves must be retarded by about 40° in the presence of a severe A.C. system fault. The need for this retardation will be better appreciated from a review of FIG. 3 of the drawings wherein the normal symmetrical A.C. valve voltages are shown in a conventional polar diagram as constituting essentially constant amplitude sectors displaced 30° apart on a circle. The diagram shown is for a twelve-pulse HVDC converter comprised of two six thyristor bridges, a high bridge and a low bridge. The voltages appearing across the thyristors of the six valve low bridge are unprimed and the voltages appearing across the six valve high bridge are primed. It will be seen in FIG. 3 that upon the occurrence of a worse case fault condition the magnitude of certain of the sectors will be decreased and they are shifted in phase with respect to the normal vectorial position. For example, considering the voltage depicted by vector #5, it will be seen that this vector, upon the onset of the fault condition, is shifted 40° in a lagging direction and its magnitude is about halved. Similar decrease in magnitude and shifting to either a leading or lagging condition are experienced by others of the phase voltages as depicted in the diagram. From a comparison of this same vector to the best case condition shown in FIG. 2, it will be seen that the shift in phase is only to a 30° lagging condition and the decrease in magnitude is not so great.

Figure 4:
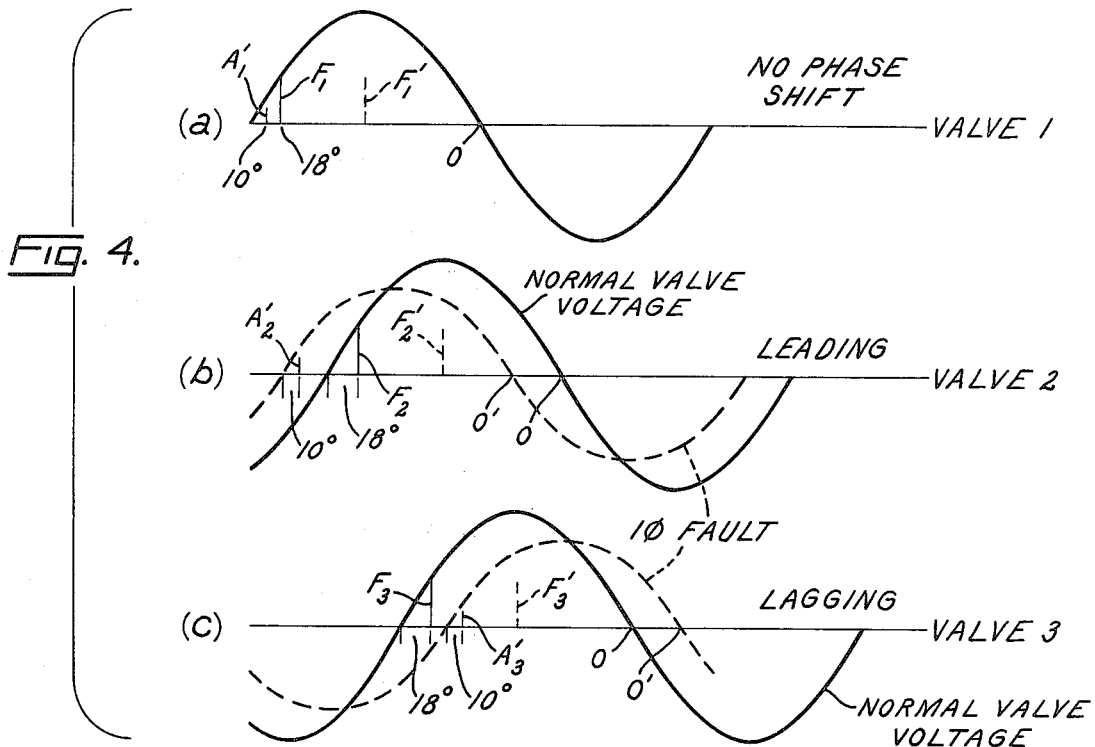
FIG. 4 illustrates a series of conventional sine wave valve voltage curves derived from FIG. 3, for example, and shows more clearly the manner in which certain of the phases of the multiphase system produce leading valve voltages across the thyristors of the HVDC converter while other of the phases produce lagging thyristor valve voltages upon the occurrence of a single-phase nearby A.C. fault.

FIG. 4 of the drawings illustrates the same phenomena with sinusoidal waveforms wherein in each of FIGS. 4(a), 4(b) and 4(c) the normal, symmetrical A.C. waveform of the supply voltage is shown for respective valves #1, #2 and #3. Assuming a normal valve voltage condition, then the occurrence of the equidistant-spaced firing pulses for each of the respective valves is shown at $F_1$, $F_2$ and $F_3$, respectively. It is assumed that this particular positioning in phase of the thyristor valve gating-on firing pulses satisfies the power requirements imposed on the converter at the instant shown. Upon the onset of a transient fault condition such as a single-phase fault near the rectifier end of the HVDC transmission system, the voltage appearing across valve #2 will be shifted to a leading condition relative to the normal valve voltage as shown by the dotted line curve in FIG. 14(b). In contrast, the voltage across thyristor valve #3 is shifted in a lagging direction and reduced in amplitude as shown by the dotted line curve in FIG. 14(c). If nothing were done to correct the timing of the firing pulses under the situation depicted in FIGS. 4(a) through 4(c), it will be seen that while valve #1 will operate properly, the firing pulse $F_2$ supplied to thyristor valve #2 will be late with respect to the leading voltage applied across the valve at that instant in time thus reducing power output even beyond that required due to the reduced amplitude of the voltage. With respect to valve #3, it will be seen that the normal equidistant-spaced firing pulse $F_3$ will occur even before the lagging voltage across valve #3 passes through zero in a positive going direction so as to enable the thyristor to conduct thereby leading to a misfire and failure to commutate off valve #1.

U.S. Pat. No. 3,701,938 describes a minimum valve voltage method and control for HVDC power converters wherein the timing of the normally supplied firing pulses $F_1$, $F_2$, $F_3$, etc., upon detection of an asymmetrical supply voltage condition, automatically retards the phase angle of the firing pulses to the phase position shown by the dotted outline pulses $F_1'$, $F_2'$, $F_3'$, etc. By this means, it is at least assured that the voltage across all of the thyristor valves in the converter bridge will go positive in advance of the supply of a firing pulse to the gate drives thereof. Only a cursory examination of FIG. 4 will reveal that by so severely retarding the firing angle of all of the firing pulses in this manner, a considerable reduction in power transmitted through the converter occurs particularly with respect to those phases which have a leading valve voltage such as valve #2. It has been estimated that because of this fact, power transmission through the HVDC transmission system drops to only about 30% of the normal rated power setting. Because of the big drop in rectifier output voltage it is probable that the converter current may even fall to zero due to the discharge of the D.C. filter element comprising a part of the HVDC transmission link. If this should happen, it then becomes necessary to close the by-pass switch and restart the entire system resulting in a period of several cycles when there is no power transmission at all.

Calculations have indicated that if nonequidistant firing pulses were supplied to the HVDC thyristor of the power converter during unsymmetrical A.C. power supply conditions such as those depicted in FIGS. 2–4, power transmission could be maintained at about 60% of rated power and the lesser voltage drop thus experienced probably could avoid the loss of current in the HVDC transmission link as described above. The disadvantage experienced because of increased harmonics produced by the nonequidistant firing during such unsymmetrical A.C. power supply voltage conditions can be tolerated in view of the fact that the worst-case duration predicted for such disturbances is relatively short (about 15 cycles) for a 60 hertz supply.

In accordance with the present invention, the voltage across each thyristor valve in the power converter bridge is sensed and an output signal derived which is indicative of the zero crossing of the valve voltage in a positive going direction which results in enabling the thyristor valve for conduction. Such arrangements have been used in the past for firing each valve individually as discussed earlier, but have not been used in conjunction with an equidistant-spaced firing pulse gating arrangement to complement the equidistant firing pulses only during intervals when the three-phase supply system is not symmetrical as taught in the present application. For the purpose of example, it will be assumed that the zero crossing signal will be produced by a suitable sensor at some point say 10° after the supply voltage has passed through zero in the positive going direction. The occurrence of these zero crossing pulses at some 10° after the applied A.C. system voltage passes through zero going positive, are shown at $A_1'$, $A_2'$ and $A_3'$ in FIGS. 4(a), 4(b) and 4(c), respectively. It will be seen from these figures that the occurrence of the $A_1'$, $A_2'$ and $A_3'$ zero crossing pulses are not equidistant-spaced relative to each other but invariably occur at some point 10° after the supply voltage goes positive across the respective thyristor valve to which it is applied. Thus, safe firing of each thyristor valve in succession, and commutation off of the previously conducting thyristor, is assured. Not only this, but it will be seen that the phase positioning of the zero crossing pulses $A_1'$, $A_2'$, $A_3'$ are either advanced or delayed in phase depending upon the phase of the supply voltage across each of the respective thyristors so that upon the thyristor being rendered conductive, it will conduct across substantially the full remaining 170° phase period during which it is enabled, thus assuring transmission of maximum available power during the fault condition.

Figure 1:
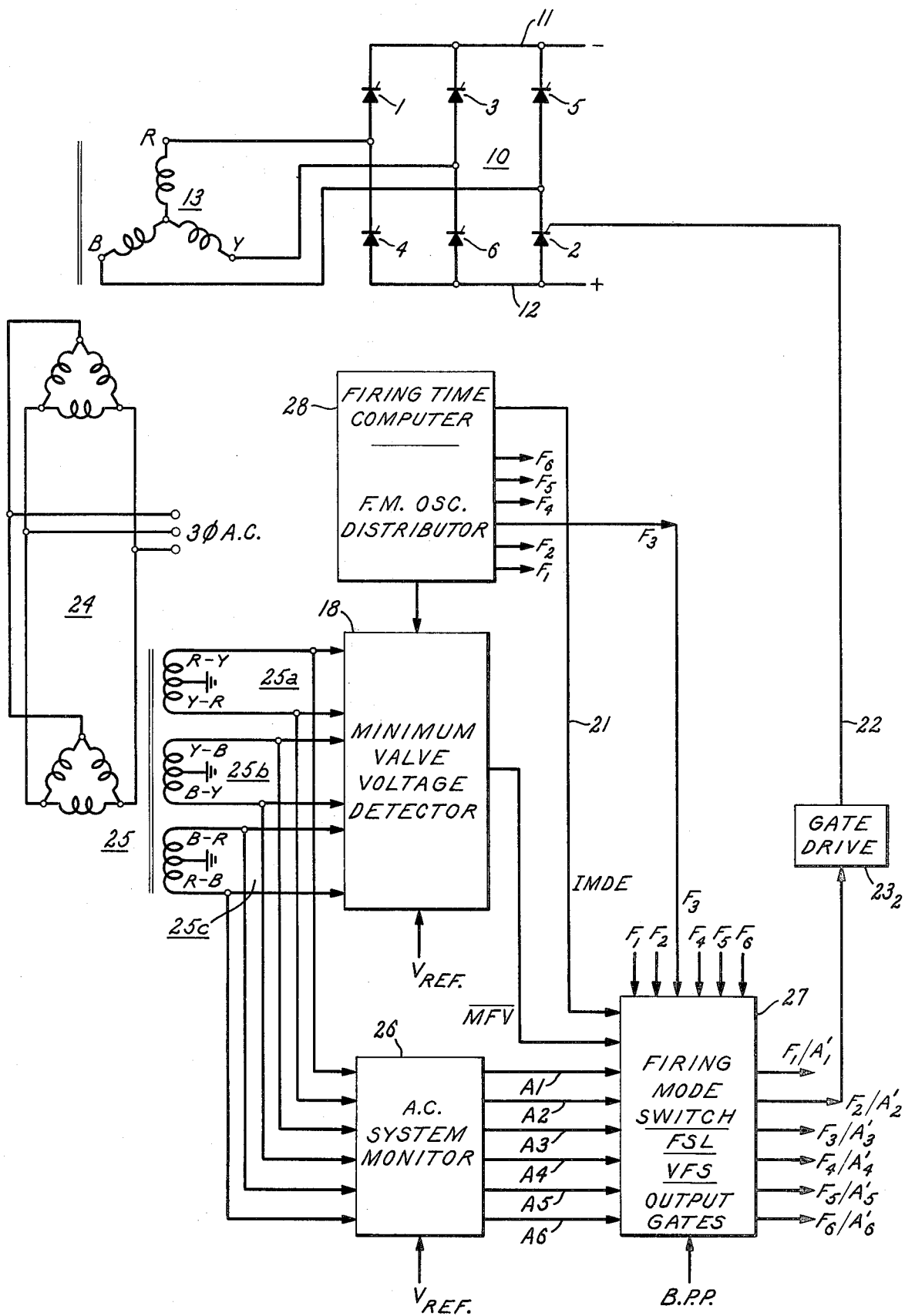
FIG. 1 is a functional block diagram showing the overall arrangement of an HVDC power converter employing the invention and illustrates the various essential subsystems and interconnections thereof required to practice the invention.
Figure 5:
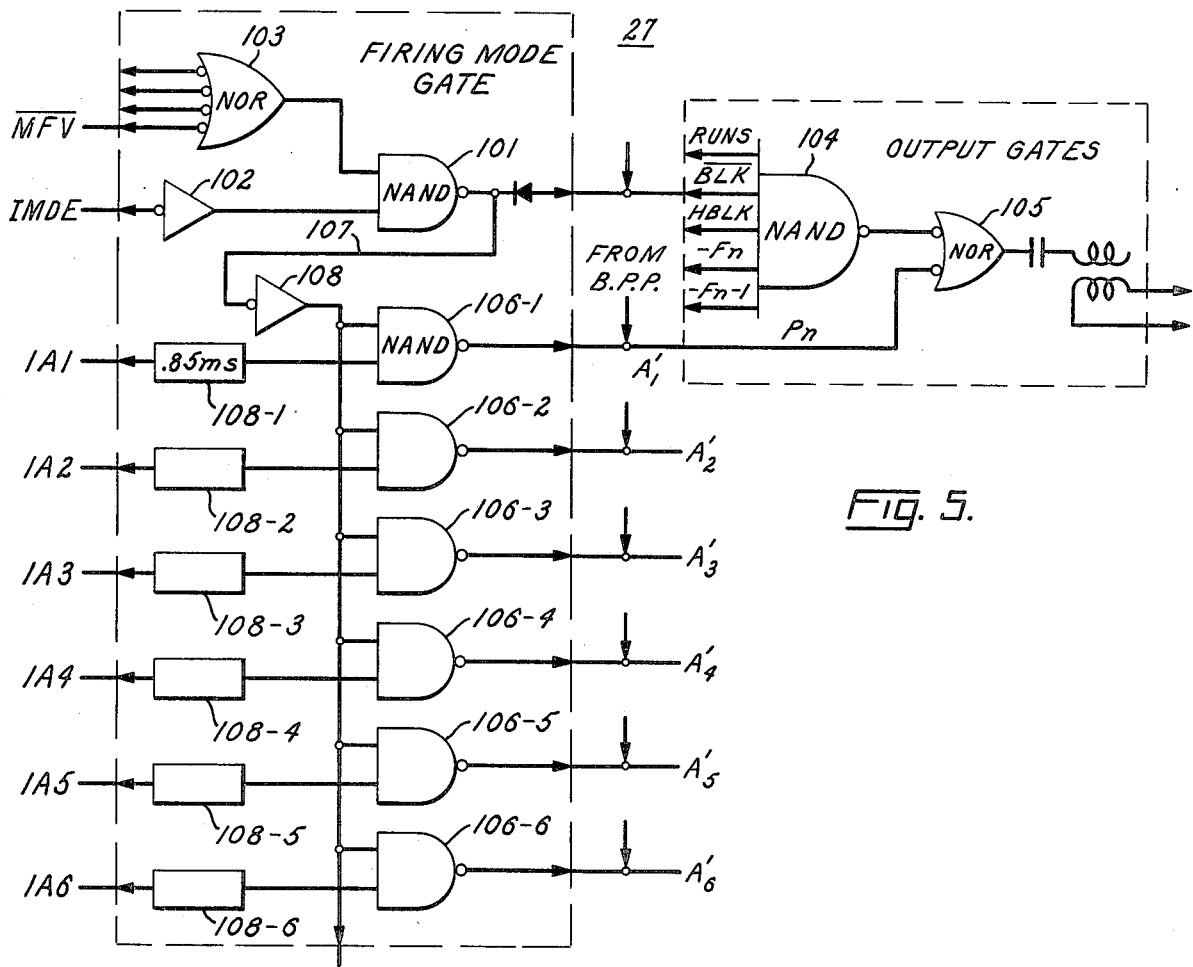
FIG. 5 is a functional block diagram illustrating one known form of construction for the firing mode switch and output gate arrangement employed in the system shown in block diagram in FIG. 1.

FIG. 5 of the drawings, considered in conjunction with FIG. 1, illustrates one apparatus and technique of implementing the above briefly described method of controlling power during asymmetrical A.C. supply voltage conditions occasioned by the occurrence of a fault with an HVDC power converter normally employing an equidistant-spaced gating-on firing pulse arrangement with normal, symmetrical, multiphase A.C. supply system voltages. FIG. 1 is a functional block diagram of a new and improved control for HVDC converters according to the invention and comprises a three-phase transformer coupled, six-pulse HVDC bridge converter employing six thyristor valves 1-6. The thyristor valves 1 and 4 are connected in series across a pair of D.C. conductors 11 and 12 and have their junction connected to one phase winding R of a three-phase A.C. supply transformer secondary 13. The thyristor valves 3 and 6 likewise are connected in series across the D.C. conductors 11 and 12 and have their junction connected in common to the Y phase winding of supply transformer secondary 13 and thyristor valves 2 and 5 are connected in series between D.C. conductors 11 and 12 and have their junction connected in common to the B phase winding of supply transformer secondary 13. The secondary windings R, B and Y are inductively coupled to corresponding Δ connected primary windings comprising a part of a three-phase alternating current supply/output network 24 for supplying output alternating current under conditions where the HVDC converter is operating in the inverting mode, and for coupling input supply alternating current to the HVDC bridge converter while it is operating in a rectifying mode. The thyristor valves 1, 3 and 5, respectively, of each valve triplet have their cathodes connected in common through one of the D.C conductors 11 and a suitable direct current filter reactor (not shown) to one HVDC transmission link conductor (not shown) and the thyristor valves 2, 4 and 6 have their anodes connected in common through a remaining D.C conductor 12 to a second HVDC direct current transmission link conductor (not shown).

The thyristor valves 1-6 each preferably comprise solid state semiconductors silicon control rectifier devices (also referred to as thyristors) which now are well known in the art, but, if desired, could comprise thyratrons, ignitrons, mercury arc rectifiers or other similar, known, grid controlled conducting valves having thyristor-like operating characteristics similar to that of the silicon control rectifier as is known in the art. Further, while in the instant disclosure, the various thyristor devices (or valves) 1-6 are referred to as thyristors (or valves), it should be kept in mind that because of the intended high voltage, large current applications, these valves may in fact comprise a multiplicity of parallel and/or series connected silicon control rectifier units or cells, interconnected in parallel for large current and in series for large voltage to form the desired individual valves depicted in the functional circuit arrangement of FIG. 1. Such parallel and/or series interconnections of individual thyristor cells to form grid controlled, conducting valves of desired high voltage and current conducting capability, is well known in the art and will not be described further in detail.

It should be noted further that while the present invention is described for use in conjunction with a six-pulse bridge circuit, in practice it may be used with a twelve-pulse bridge circuit comprised by twelve thyristor valves as defined in the preceding paragraph. Such a twelve-pulse bridge would comprise two series connected six-pulse bridges each similar to that shown in FIG. 1 and supplied with suitably phased alternating current potentials from Y and/or Δ transformer windings appropriately interconnected to provide a phase displacement of 30° between the respective A.C. terminals of the two bridges comprising the twelve-pulse converter in a manner well known in the art. If desired, other known multipulse power converter arrangements also can be used in practicing the invention.

Figure 6:
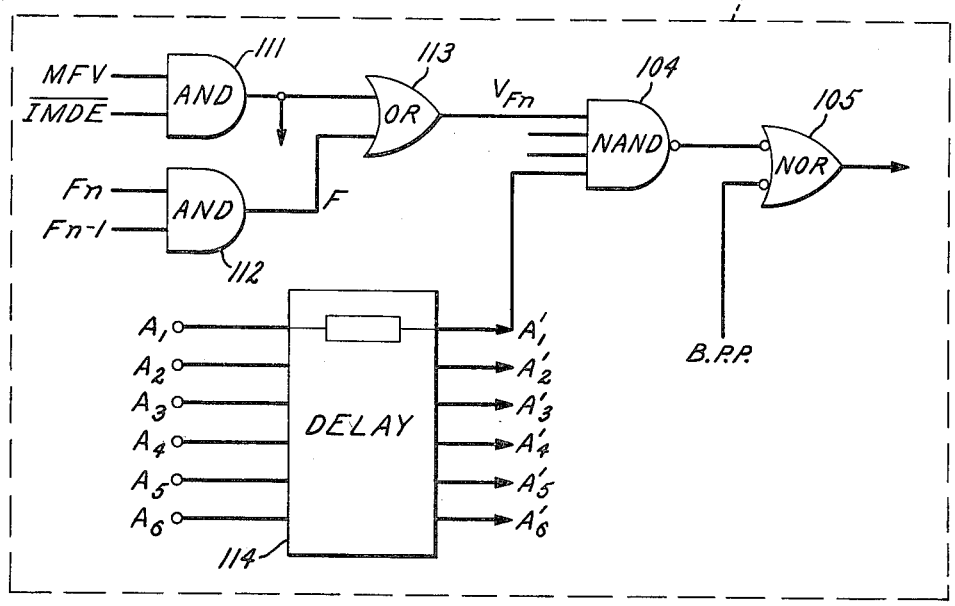
FIG. 6 is a preferred, alternative firing mode switch gate and output gate arrangement for use with the system of FIG. 1.
Figure 7:
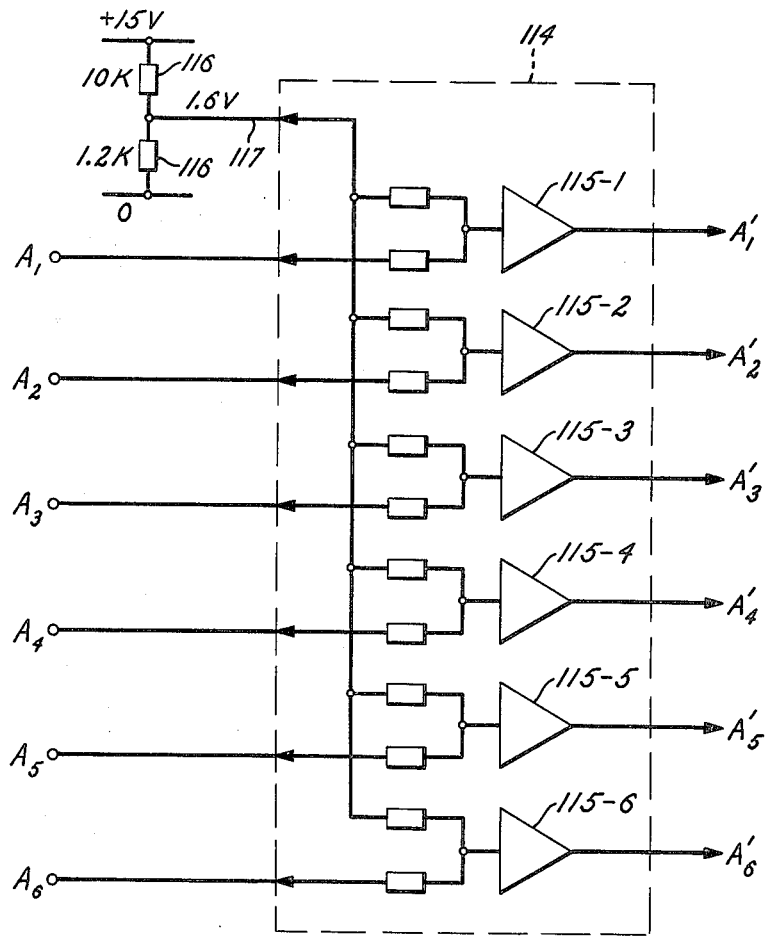
FIG. 7 is a schematic block diagram of a preferred form of delay circuit employed with the switching mode circuit arrangement shown in FIG. 6.

Referring again to FIG. 1 of the drawings, it will be seen that each of the HVDC thyristor valves 1-6 comprising the HVDC power converter 10 have their gate electrodes connected through respective conductors, or alternatively light pipes or the like, such as shown at 22 to the outputs of respective gate drives such as $23_2$ that in turn are supplied with gating-on firing pulses $F_1/A_1$, $F_2/A_2$, etc. from the output of a firing mode switch circuit 27, the construction and operation of which will be described more fully hereinafter with relation to FIGS. 5-7. The firing mode switch 27 is supplied with input signals from the output of a firing time computer 28 the construction and operation of which will be described more fully hereinafter, and these input signals comprise the normal equidistant-spaced gating-on firing pulses $F_1$, $F_2$, etc. that normally are applied to control firing or gating-on of the respective thyristors during normal operating conditions with symmetrically-shaped A.C. system supply voltages. In addition, the firing time computer 28 supplies the signal IMDE, the purpose of which will be described more fully with respect to FIGS. 5-7. A further input is supplied to the firing mode switch from a minimum valve voltage detector 18 along with a plurality of signals $A_1$, $A_2$, etc. indicative of the zero crossings of the applied A.C. voltage waveforms in a direction which will enable the respective HVDC thyristor valves 1-6 for conduction (hereinafter referred to as commutating voltage indicating signals $A_1$, $A_2$, etc.). The $A_1$, $A_2$, etc. signals are supplied to the firing mode switch 27 for application to the gate drives for the respective HVDC thyristors 1-6 under conditions where an A.C. system fault produces asymmetry in the A.C. system supply voltage waveshapes as discussed above. The manner in which the firing mode switch 27 makes the decision to apply either the normal equidistant firing pulses $F_1$, $F_2$, etc. to the gate drives for the HVDC thyristors, or alternatively to apply the commutating voltage waveform signals $A_1$, $A_2$, $A_3$ as the gating-on firing signal pulses, will be appreciated more fully after a reading of the following description.

The construction and operation of the firing time computer 28 is set forth more fully in U.S. Pat. No. 3,832,620 issued Aug. 27, 1974—Ernest M. Pollard, Inventor for a Regulating Mode Selector Scheme For An Electric Power Converter, assigned to the General Electric Company, the disclosure of which is hereby incorporated in its entirety by reference. Briefly, however, the firing time computer 28, during each cycle of the respective phase-to-phase voltages of the multiphase A.C. supply voltage system, generates and distributes for application to the respective gate drives of the HVDC thyristors, a family of six staggered output pulses, referred to hereinafter as firing signal pulses $F_1$, $F_2$, etc. The individual firing signal pulses $F_1$, $F_2$, etc., respectively, commence at intervals of 60 electrical degrees and it is their timing relative to the zero crossings of the alternating voltages on the multiphase A.C. supply system that determines the firing angles of the HVDC thyristor valves 1-6. By varying these firing angles, the direction and amount of power flowing between the alternating current system and the HVDC conductor link can be controlled in a known manner.

The firing time computer is suitably constructed and arranged to vary (within prescribed limits) the timing of the family of firing signal pulses $F_1$, $F_2$, etc. relative to the zero crossings of the alternating voltages by controlling the operation of a voltage-controlled oscillator (FM oscillator) and a distributor for sequentially issuing at the 60° interval the periodic firing signals $F_1$, $F_2$, etc. to thereby control the actual direction and quantity of power in conformance with a given power order. For this purpose, the firing time computer 28 has supplied thereto a number of input signals including amongst others a current order signal, and a current feedback signal (not shown) for deriving an error control signal that in turn controls operation of the voltage controlled oscillator if other operating parameters are in order and different limits satisfied. For a more detailed description of this part of the system, reference is made to the above-identified U.S. Pat. No. 3,832,620 and the various supporting disclosures referenced therein. Suffice it to say, that during normal operating conditions with symmetrically-shaped A.C. system voltage waveforms applied across the respective HVDC thyristors, the firing time computer 28 will emit the required equidistant-spaced firing pulses $F_1$, $F_2$, etc. to control power flow through the HVDC transmission link in accordance with a given order and in conformance with certain set operating parameters. These normal firing signal pulses $F_1$, $F_2$, etc. then are normally supplied through the firing mode switch 27 and applied to the gate drives $23_1$, $23_2$, etc. of the respective HVDC thyristors 1–6 as explained above. In addition, a control signal IMDE representative of the fact that the firing time computer 28 is in control of current for the HVDC power transmission system is supplied across a conductor 21 as an additional input to the firing mode switch 27 as will be explained more fully hereinafter with relation to FIGS. 5–7. This IMDE signal may be derived in the manner disclosed more fully in co-pending U.S. Pat. application Ser. No. 754475 filed Dec. 27, 1976 by B. D. Leete, et al. entitled "HVDC Floating Current Order System," assigned to the General Electric Company.

For a description of the construction and operation of the minimum valve voltage detector 18, reference is made to the above-identified U.S. Pat. No. 3,701,938 issued Oct. 31, 1972. Briefly, however, it can be stated that in operation the minimum valve voltage detector 18 samples the valve of the phase-to-phase voltage associated with each of the thyristors 1–6 of the HVDC bridge power converter at the time of turn-on of the valves. For this purpose the various phase-to-phase commutating voltages appearing across the valves are sampled by means of an auxiliary step-down transformer 25 whose primary winding is connected across the three-phase power supply system 24. Auxiliary transformer 25 has a plurality of secondary windings 25a, 25b and 25c which are center tapped and provide the various phase-to-phase voltages R-Y, Y-R, Y-B, B-Y, B-R and R-B as inputs to the minimum valve voltage detector 18. In addition, the minimum valve voltage detector 18 has a reference voltage $V_{ref}$ supplied thereto which is representative of a predetermined minimum valve voltage which the anode to cathode voltages appearing across the respective thyristor valves 1–6 should exceed in advance of having firing pulses supplied to the gates thereof through their respective gate drives. The minimum valve voltage detector 18 then operates to derive an output error control signal which heretofore has been used to increase the $\alpha_{min}$ limit setting as described in the above-referenced U.S. Pat. No. 3,701,938 but alternatively is used as a minimum firing voltage (MFV) alarm signal for supply as a controlling input signal to the firing mode switch 27 as described hereinafter.

For a more detailed description of the construction and operation of the A.C. system monitor, reference is made to U.S. Pat. No. 3,771,041 Chadwick, assigned to the assignee of the present invention. Briefly, however, it can be stated that the A.C. system monitor includes as a part thereof the auxiliary A.C. transformer 25 which provides a voltage step-down with the center tapped secondary winding having additional conductors connected thereto for supplying the phase-to-phase A.C. commutating voltage waveform signals to the input of the A.C. system monitor 26 in addition to being applied as inputs to the minimum valve voltage detector 18. The A.C. system monitor 26 processes the voltages in a well-known manner in conjunction with an input reference voltage $V_{ref}$ to derive output, individual, square wave-shaped commutating voltage waveform indicating signals whose duration correspond to the commencement and end of the positive half cycle valve commutating voltages appearing across the respective HVDC thyristors 1–6. These A.C. system commutating voltage indicating signals shown as $A_1$, $A_2$, etc. then are supplied as additional inputs to the firing mode switch 27.

Referring again to FIG. 5 of the drawings, one form of a suitable firing mode switch employing delay and gate circuits is illustrated. The firing mode switch 27 shown in FIG. 5 includes a firing mode NAND gate 101 of conventional construction having the IMDE input applied through an inverter 102 as one of two inputs thereto. In addition, a NOR gate 103 has its output supplied as a remaining input to the NAND gate 101 and has a multiplicity of inputs including as one of them a $\overline{MFV}$ controlling signal derived from the output of the minimum valve voltage detector. The $\overline{MFV}$ is the inverse of the MFV signal in that it disappears upon the occurrence of a minimum valve voltage condition and the production of a MFV minimum firing voltage warning signal. In FIG. 6, a circuit arrangement will be described which uses the MFV signal directly so that it should be understood that insofar as the signal processing is concerned, the presence of a minimum valve voltage warning condition can be signaled either by the MFV signal or its inverse companion $\overline{MFV}$ as is well known in the logic circuit art. Besides the $\overline{MFV}$ signal additional controlling signals may be applied to the input of NOR gate 103 as needed for a particular installation and control design wherein additional controlling parameters are provided which complement the control of the instant invention. By reason of the particular combination of logic signals to NAND gate 101, this gate serves as the main firing mode determining gate and when it is enabled, application of the normal firing pulses $F_1$, $F_2$, etc. is supplied through output NAND 104 and output NOR gate 103 to the gate drives for the respective HVDC thyristors. Similar to NOR gate 103, the output NAND gate 104 may have additional inputs such as a RUN and a not $\overline{BLK}$ or other additional controlling signals applied to its input in conjunction with the output of the firing mode NAND gate 101. If desired, the NAND gate 101 output may be applied to the input of output NAND gate 104 in common with one of the other controlling signals such as the $\overline{BLK}$ signal.

With firing mode NAND gate 101 enabled, a plurality of commutating voltage waveform signal NAND gates shown at 106-1, 106-2, etc. will be inhibited due to the existence of an interconnecting conductor 107 and inverter 108 which will cause the NAND gates 106-1, 106-2, etc. to inhibit further transmission of the respective commutating voltage waveform signals A-1, A-2, etc. applied to the remaining inputs of NAND gates 106-1, 106-2, etc., respectively, through respective delay circuits 108-1, 108-2, etc. during normal operating conditions in the presence of symmetrically-shaped A.C. system supply voltages. Thus, under normal conditions, the equidistantspaced firing pulses derived by the firing time computer 28 normally are supplied through output NAND gate 104 and output NOR gate 105 to control firing of the HVDC thyristor valves. During such operation, for various reasons, it may be desired to apply other control firing pulses to the gate drives for the thyristors, for example, to form by-pass pairs of thyristor valves such as 1 and 4, etc. to initiate a shut down, and these can be applied through the remaining input to output NOR gate 105 as indicated by the arrow input marked from BPP. These additional control inputs may be connected in common with the outputs from the NAND gates 106-1, 106-2, etc. as shown in FIG. 5.

In the event of an A.C. supply system disturbance, such as indicated by FIGS. 2-4 of teh drawings, the minimum valve voltage detector 18 shown in FIG. 1 will produce an output alarm signal which will cause removal of the $\overline{MFV}$ signal from the input of NAND gate 101 via NOR gate 103. Likewise, the disturbance results in the disappearance of the enabling input IMDE and this in turn results in removal of one of the necessary enabling inputs to output NAND gate 104 and causes it to assume a blocking condition. If, as suggested earlier, the output from NAND gate 101 is wired in common with an additional control input, the signals appearing on the commonly wired lead will have to be compatible in the sense that the commonly wire signals such as not block $\overline{BLK}$ disappear concurrently with IMDE. As a consequence, NAND gate 104 becomes inhibited and no further normal equidistant-spaced firing pulses $F_1$, $F_2$, etc. can be supplied to the gate drives of the respective HVDC thyristors through NAND gate 104.

Simultaneously with the disappearnace of the enabling IMDE signal, the inputs of the NAND gates 106-1 through 106-6 connected to the output of inverter 108 will be enabled. Consequently, upon the appearance of the $A_1$-$A_6$ commutating voltage indicating signals supplied from the output of the A.C. system monitor 26 in FIG. 1, these signals will be delayed for a predetermined time period (for example, .85 milliseconds) by the delay circuits 108-1 through 108-6 and then supplied in sequence through the respective NAND gates 106-1 through 106-6 and output NOR gates 105 to the gate drives for the respective HVDC thyristors 1-6 shown in FIG. 1. Accordingly, it will be appreciated that upon the occurrence of a transient A.C. system fault causing unsymmetrical supply voltages of the type depicted in FIGS. 2-4, the firing of the respective HVDC thyristors will be either advanced or delayed dependent upon the phase advance or retardation of the respective thyristor valve commutation voltages applied by the A.C. system across the thyristor valves as discussed previously with respect to FIG. 4. Hence, maximum available power will continue to be supplied through the HVDC transmission system consistent with the available A.C. supply while at the same time assuring against valve misfiring due to inadequate commutation voltage across any one of the HVDC thyristors.

FIGS. 6 and 7 illustrate a preferred form of construction for the firing mode switch 27 for use in place of the arrangement shown in FIG. 5. In FIG. 6, positive logic in the form of two input AND gates 111 and 112 and an OR gate 113 are used to supply the normal, equidistant-spaced firing pulses $F_1$, $F_2$, etc. to the output NAND gate 104 and thence through output NOR gate 105 to the gate drives of thyristor valves 1-6, respectively, as described with relation to FIG. 5. The AND gate 111 has supplied to its input the positive form of the minimum firing voltage alarm signal (MFV) derived from the output of the minimum valve voltage detector in place of the inverse signal $\overline{MFV}$ used in the arrangement of FIG. 5. Conversely, the remaining input of AND gate 111 is supplied with the inverse $\overline{IMDE}$ signal derived from the firing time computer 28 as described previously. It will be understood that there will be a total of six, twelve, or whatever number of such input AND gate and OR gate arrangements are required for each respective channel (HVDC thyristor) in the HVDC power converter in the same manner depicted in FIG. 5. Hence, there will be a total of six input AND gates such As 111 for each 6 pulse thyristor bridge with each AND gate 111 having a respective associated AND gate 112 and OR gate 113 and output NAND gate 104 and NOR gate 105. The AND gate 112 has supplied to its input the normally applied, equidistant-spaced firing pulses $F_1$, $F_2$, etc. and its output likewise is supplied as an input to OR gate 113 whose output then is supplied as one of the inputs to the output NAND gate 104. Another of the inputs to NAND gate 104 will be the respective thyristor commutating voltage indicating signals $A_1'$, $A_2'$, etc. after processing through a suitable delay processing circuit 114 whose construction will be described more fully hereafter with relation to FIG. 7. The output from NAND gate 104 then is supplied through NOR gate 105 to the gate drive for a respective HVDC thyristor.

During normal operating conditions with symmetrically-shaped A.C. system voltage waveforms being supplied to the HVDC converter, the MFV and $\overline{IMDE}$ signals will not be present and AND gate 111 will be inhibited. The $F_1$, $F_2$, etc. equidistant-spaced firing pulses, however, are always present in sequence for the respective phases and will result in deriving a $V_{FN}$ output signal from OR gate 113 which is a substantially squarewave-shaped signal having a duration extending over substantially 120° of the normal supply voltage A.C. waveform period. In addition to the enabling $V_{FN}$ signal applied to its output, output NAND gate 104 has supplied to it additional controlling, enabling signals such as the RUNS and $\overline{BLK}$ signals as discussed previously with respect to FIG. 5 of te drawings, and which in effect constitute enabling, safety interlock signals to assure safe operation of the HVDC power converter. Lastly, as stated above, another respective input to the output NAND gate 104 is supplied from a delay circuit 114 whose construction is shown more fully in FIG. 7 of the drawings.

The delay circuit 114 comprises a plurality of comparators 115-1, 115-2, etc. which have applied to the inputs thereof the respective commutating valve voltage waveform signals $A_1$, $A_2$, etc. supplied from the output of the A.C. system monitor 26. Additionally, a reference voltage is supplied in common to the input of all the comparators 115-1 through 115-6 from a source of reference potential comprised by voltage dividing resistors 116 via a conductor 117 and a set of summing resistors connected to the inputs of the respective comparators 115-1 through 115-6. With this arrangement, the comparator 115-1 will not be rendered conductive unless and until the input thyristor valve commutating valve voltage waveform signal, such as $A_1$, exceeds the value of the bias potential supplied from the voltage dividing network 116. By this means, it is assured that the output, compensated, thyristor valve commutating voltages represented by the indicating signals $A_1'$, $A_2'$, etc. derived from the output of the delay network 114, will always exceed a predetermined safe value as set by the reference level voltage supplied from voltage dividing resistors 116 across conductor 117 to the input of the respective comparators 115-1 through 115-6. The respective, compensated, thyristor valve commutating voltage indicating signals $A_1'$, $A_2'$, etc. each of which may extend over a period of about 170° of the normal period of the commutating voltage waveform are supplied as an additional input to the respective output NAND gates 104 for each of the thyristor valves in the HVDC power converter.

During normal operaion, the compensated output thyristor valve commutating voltage indicating signals $A_1'$, $A_2'$, etc. supplied from the delay network 114 to the input of the respective output NAND gates 104 will be enabling over substantially 170° of the supply A.C. voltage waveform. Thus, during normal operating conditions the $A_1'$, $A_2'$, etc. enabling potentials will always be applied to output NAND gate 104 in advance of the $V_{FN}$ enabling potential supplied by input AND gate 112 through OR gate 113 and which extends for only about 120° of the normal A.C. supply voltage period. Consequently, NAND gate 104 will be enabled at the desired equidistant space firing time set by the equidistant-spaced firing pulses $F_1$, $F_2$ etc. These equidistant-spaced firing pulses then will be supplied through output NOR gate 105 to the gate drives for the respective HVDC thyristor valves under normal conditions. In the event it becomes necessary or desirable to form a by-pass pair, or take over control measures required in the operation of the HVDC power converter, the by-pass pair enabling signal shown as BPP may be supplied through one of the other inputs to the output NOR gate 105. As stated earlier, for this purpose each thyristor valve in the HVDC power converter has its own associated output NAND gate 104 and output NOR gate 105 together with the respectively applied $F_1$ pulse and $A_1'$ commutating voltage indicating enabling signals.

Should a supply A.C. system disturbance occur having the effects discussed with relation to FIGS. 2–4, the $F_1$, $F_2$, etc. normal firing signal pulses will continue to be supplied through AND gate 112. However, upon such an A.C. system fault, the MFV and $\overline{IMDE}$ signals also will be present and will be applied to the input of the AND gate 111. This results in enabling the AND gate 111 which is connected in common to respective OR gates 113 for each of the HVDC thyristors comprising the HVDC power converter being controlled. Upon such occurrence, the output from OR gate 113 will be continuously enabled by the presence of the $V_{FN}$ potential at its input for the period of the fault and until the MFV and/or $\overline{IMDE}$ signals are removed and the AND gate 111 is blocked. The minimum valve voltage detector 18 is designed such that the MFV signal remains present for a period somewhat longer than the A.C. system disturbance so that in the ordinary course of events the $\overline{IMDE}$ signal disappears first thus blocking AND gate 111 and automatically reverts the system back to the normal operation mode as described above. However, for so long as both the MFV and $\overline{IMDE}$ signals are present, AND gate 111 causes OR gate 113 to enable the input of output NAND gate 104 continuously with the $V_{FN}$ signal. As a consequence, output NAND gate 104 then will be enabled at the instant of the appearance of the respective thyristor valve delayed commutation voltage indicating signals $A_1'$, $A_2'$, etc. after processing in the delay network 114. Thus, in the event of a phase advance such as the phase associated with the $A_2'$ signal shown in FIG. 4, the thyristor valve excited by the commutating voltages represented by the $A_2'$ indicating signal, will be turned on at the instant that the commutating voltage across the valve swings positive and allows the thyristor valve to be turned on safely. Conversely, if the phase of the A.C. excitation voltage has been delayed, as shown, for example, by the commutating voltage indicating signal $A_3'$ in FIG. 4, firing of the thyristor valve 3 will be delayed until such time that the commutating voltage across the valve allows it to be turned on safely to assure commutation off of the previously conducting thyristor valve #1. The output gating-on firing signals thus derived are supplied through the respective output NOR gates 105 to the gate drives for the respective thyristor valves. In the event it is desired to form bypass pairs, or take other control action during the period of time while the nonequidistant commutating voltage indicating signals $A_1'$, $A_2'$, etc. are controlling gating-on of the respective thyristor valves, the BPP signal may be supplied through a remaining input to the appropriate output NOR gate 105 for this purpose.

From the foregoing description it will be appreciated that the invention provides a novel control and method of its use for maintaining optimum performance and power transfer through HVDC power transmission systems during A.C. system faults affecting the rectifier end of the system. The novel control is designed for use with HVDC power converters of the type normally employing equidistant-spaced firing pulses. The control utilizes means for sensing the occurrence of a nearby single-phase fault in a multiphase A.C. supply system for supplying voltage across the HVDC thyristor valves of the power converter and which results in advancing the phase of certain of the thyristor valve commutating voltages while retarding the phase of other of the thyristor valve commutating voltages. The novel control includes means for deriving control signals for delaying the firing (gating-on) of the thyristor valves whose A.C. supply commutating voltages are retarded in phase and advancing the firing of the HVDC thyristor valves whose commutating voltages are advanced in phase thereby assuring that at all times adequate commutating voltage exists across the respective thyristor valves to assure safe turn-on and commutating-off of a previously conducting thyristor thereby assuring maximum power transfer through the HVDC system in the presence of the A.C. system fault.

Having described two embodiments of a method and control for maintaining optimum performance of HVDC power transmission systems at the rectifier end during A.C. system faults in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

What is claimed is:

1. In an HVDC power converter comprising a plurality of valves connected in an HVDC bridge arrangement intermediate a multiphase alternating current system and at least one HVDC power conductor link together with gating circuit means for gating-on respective ones of said valves during selected intervals of the alternating current periods of the respective phases, the said gating circuit means including equidistant-spaced gate firing pulse generating means for supplying equidistant-spaced gating-on firing pulses to gate drive circuit means for the respective valves of the HVDC bridge power converter during normal operation of the converter in the presence of symmetrically-shaped A.C. system voltage waveforms; the improvement comprising firing mode switch means connected intermediate the equidistant-spaced gate firing pulse generating means and the gate drive means for the respective valves, A.C. system monitor means coupled to the A.C. system in parallel circuit relationship with the HVDC bridge for reducing and monitoring the voltage waveshapes of the A.C. system voltage for detecting the points at which the respective phase-to-phase voltages of the multiphase alternating current system pass through zero voltage value in a direction which will enable the respective associated HVDC valves for conduction and for deriving commutating voltage-indicating signals indicative of this occurrence, minimum valve voltage detector means coupled to the A.C. system in addition to the A.C. system monitor means for sensing that any of the A.C. system phase-to-phase voltages are below a predetermined minimum safe level required to assure safe operation of the HVDC power converter and deriving an output minimum valve voltage alarm signal under conditions where the minimum safe level has not been attained by the voltage across any one of the HVDC valves, and means for applying the output minimum valve voltage alarm signal to the firing mode switch means for controlling the operating thereof; said firing mode switch means including means for effectively removing the normal equidistant-spaced firing pulses from effective application to the gate drives of the respective HVDC valves and effectively coupling said commutating voltage-indicating signals for the respective phases to the gate drive means for the respective HVDC valves in the presence of a minimum valve voltage alarm signal for use as gating-on firing pulses for the HVDC valves under conditions where asymmetries occur in the A.C. system voltage waveforms due to transient disturbances affecting the system, said firing mode switch means further automatically decoupling said commutating voltage indicating signals from the gate drives for the HVDC valves upon termination of the minimum valve voltage alarm signal and reapplying the normal equidistant-spaced firing pulses thereto.

2. An HVDC power converter according to claim 1 further including means for delaying application of the commutating voltage indicating signals for the respective phase voltages of the multiphase alternating current system to the gate drives for the HVDC valves for a sufficient period to assure that the voltage across the associated HVDC valve has attained a predetermined minimum safe voltage value.

3. An HVDC power converter according to claim 1 wherein during certain types of A.C. system faults such as a close-by single-phase fault affecting the rectifier end of the HVDC power transmission system, the zero crossing occurrences of certain phases are delayed and the zero crossing occurrences of other phases are advanced and wherein the firing mode switch means under the control of the minimum valve voltage alarm signal assures that none of the HVDC valves are gated-on until the voltage across the respective valve is sufficient to assure safe turn-on and commutation off of a previously conducting valve thereby automatically delaying turn-on of certain of the HVDC valves wherein the zero crossings are delayed and automatically advancing turn-on of other HVDC valves wherein the zero crossings are advanced to thereby maintain maximum power transfer through the HVDC power converter during transient fault conditions.

4. An HVDC power converter according to claim 2 wherein during certain types of A.C. system faults such as a close-by single-phase fault, the zero crossing occurrences of certain phases are delayed and the zero crossing occurrences of other phases are advanced and wherein the firing mode switch means under the control of the minimum valve voltage alarm signal assures that none of the HVDC valves are gated-on until the voltage across the respective valves is sufficient to assure safe turn-on and commutation off of a previously conducting valve thereby automatically delaying turn-on of certain of the HVDC valves wherein the zero crossings are delayed and automatically advancing turn-on of other HVDC valves wherein the zero crossings are advanced to thereby maintain maximum power transfer through the HVDC power converter during transient fault conditions.

5. An HVDC power converter according to claim 1 further including means for blocking application of the normal equidistant-spaced firing pulses to the gate drive means of the HVDC valves in response to the occurrence of the minimum valve voltage alarm signal and applying only the nonequidistant-spaced commutating voltage indicating signals to the gate drive means for the HVDC valves as gating-on firing pulses during such occurrences.

6. An HVDC power converter according to claim 4 further including means for blocking application of the normal equidistant-spaced firing pulses to the gate drive means of the HVDC valves in response to the occurrence of the minimum valve voltage alarm signal and applying only the nonequidistant-spaced commutating voltage indicating signals to the gate drive means for the HVDC valves as gating-on firing pulses during such occurrences.

7. An HVDC power converter according to claim 1 further including common output gate circuit means for selective application of HVDC valve by-pass pair formation gating signals and the like to the gate drive means of the respective HVDC valves in conjunction with either the equidistant-spaced normal gating-on firing pulses or alternatively the nonequidistant-spaced gating-on firing pulses derived from the commutating voltage indicating signals of the A.C. system monitor in the presence of a transient fault.

8. An HVDC power converter according to claim 6 further including common output gate circuit means for selective application of HVDC valve by-pass pair formation gating signals and the like to the gate drive means of the respective HVDC valves in conjunction with either the equidistant-spaced normal gating-on firing pulses or alternatively the nonequidistant-spaced gating-on firing pulses derived from the commutating voltage indicating signals of the A.C. system monitor in the presence of a transient fault.

9. A control subassembly for HVDC power converters for use during transient faults affecting the A.C. system employed with the HVDC power converter to assure the presence of adequate firing and commutating voltages across the respective HVDC valves during the successive turn-on and turn-off of the valves while the HVDC power converter is operating even in the presence of severe transient multiphase A.C. system faults, the HVDC power converters being of the type which include equidistant-spaced firing pulse gating-on circuit means for normally supplying equidistant-spaced gating-on firing pulses to the gate drive means for the gates of the respective HVDC valves under normal operating conditions in the presence of symmetrically-shaped multiphase A.C. system voltage waveforms; said control subassembly comprising means for detecting and deriving output A.C. system commutating voltage indicating signals indicative of the point at which the respective phase-to-phase voltages of the multiphase A.C. system pass through zero in a direction which will enable the respective associated HVDC valves for conduction, means for sensing that any of the A.C. system phase voltages are below a predetermined minimum safe voltage value required to assure safe operation of the HVDC power converter and deriving an output minimum valve voltage alarm signal under conditions where the minimum safe level has not been attained by the voltage across any one of the HVDC valves, firing mode switch means for connection to the gate drive means of the HVDC valves intermediate the gate drive means and the equidistant-spaced gating-on firing pulse circuit means, said firing mode switch means including means for effectively removing the normal equidistant-spaced firing pulses from effective application to the gate drives of the respective HVDC valves and effectively coupling the commutating voltage indicating signals for the respective phases to the gate drive means for the respective HVDC valves in the presence of a minimum valve voltage alarm signal for use as gating-on firing pulses for the HVDC valves under conditions where asymmetries occur in the A.C. system, said firing mode switch means further automatically decoupling the commutating voltage indicating signals from the gate drives for the HVDC thyristors after termination of the minimum valve voltage alarm signal and reapplying the normal equidistant-spaced firing pulses thereto and means for applying the minimum valve voltage alarm signal to the firing mode switch means for controlling the operation thereof.

10. An HVDC power converter control subassembly according to claim 9 further including means for delaying application of the commutating voltage indicating signals indicative of the point at which the respective phase-to-phase voltages of the multiphase alternating current system pass through zero voltage value in a direction which will enable the respective associated HVDC valve for conduction for a sufficient period to assure that the voltage across the associated HVDC valve has attained a predetermined minimum reference voltage value.

11. An HVDC power converter control subassembly according to claim 9 wherein during certain types of A.C. system faults such as a close-by single-phase fault, the zero crossing occurrences of certain phases are delayed and the zero crossing occurrences of other phases are advanced and wherein the firing mode switch means under the control of the minimum valve voltage alarm signal assures that none of the HVDC valves are gated-on until the voltage across the respective valve is sufficient to assure safe turn-on and commutation off of a previously conducting valve thereby automatically delaying turn-on of certain of the HVDC valves wherein the zero crossings are delayed and automatically advancing turn-on of other HVDC valves wherein the zero crossings are advanced to thereby maintain maximum power transfer through the HVDC power converter during transient fault conditions.

12. An HVDC power converter control subassembly according to claim 10 wherein during certain types of A.C. system faults such as a close-by single-phase fault, the zero crossing occurrences of certain phases are delayed and the zero crossing occurrences of other phases are advanced and wherein the firing mode switch means under the control of the minimum valve voltage alarm signal assures that none of the HVDC valves are gated-on until the voltage across the respective valve is sufficient to assure safe turn-on and commutation off of a previously conducting valve thereby automatically delaying turn-on of certain of the HVDC valves wherein the zero crossings are delayed and automatically advancing turn-on of other HVDC valves wherein the zero crossings are advanced to thereby maintain maximum power transfer through the HVDC power converter during transient fault conditions.

13. An HVDC power converter control subassembly according to claim 9 further including means for preventing application of the normal equidistant-spaced firing pulses to the gate drive means of the HVDC valves in response to the occurrence of the minimum valve voltage alarm signal and applying only the nonequidistant-spaced commutating voltage indicating signals to the gate drive means for the HVDC valve as gating-on firing pulses during such occurrences.

14. An HVDC power converter control subassembly according to claim 12 further including means for preventing application of the normal equidistant-spaced firing pulses to the gate drive means of the HVDC valves in response to the occurrence of the minimum valve voltage alarm signal and applying only the nonequidistant-spaced commutating voltage indicating signals to the gate drive means for the HVDC valves is gating-on firing pulses during such occurrences.

15. An HVDC power converter control subassembly according to claim 9 further including common output gate circuit means for selective application of HVDC valve by-pass pair formation gating signals and the like to the gate drive means of the respective HVDC valves in conjunction with either the equidistant-spaced normal gating-on firing pulses or alternatively the nonequidistant-spaced gating-on firing pulses derived from the commutating voltage indicating signals of the A.C. system monitor in the presence of a transient fault.

16. An HVDC power converter subassembly according to claim 14 further including common output gate circuit means for selective application of HVDC valve by-pass pair formation gating signals and the like to the gate drive means of the respective HVDC valves in conjunction with either the equidistant-spaced normal gating-on firing pulses or alternatively the nonequidistant-spaced gating-on firing pulses derived from the commutating voltage indicating signals of the A.C. system monitor in the presence of a transient fault.

17. The method of maintaining maximum available power flow through HVDC power transmission systems during the occurrence of severe A.C. system transients such as a single-phase fault in a multiphase A.C. system supplying the HVDC power transmission system and which include HVDC power converters of the type normally employing equidistant-spaced gating-on firing pulses during normal operation of the converters in the presence of symmetrically-shaped A.C. system voltage waveforms; said method comprising sensing the zero crossing of the respective phase-to-phase voltages of the multiphase alternating current system as they increase in a direction which will enable the respective associated HVDC valves for conduction and deriving output commutating voltage indicating signals indicative of this occurence, sensing that any of the A.C. system phase-to-phase voltages are below a predetermined minimum safe level required to assure safe operation of the HVDC power converter and deriving an output minimum valve voltage alarm signal under conditions where the minimum safe level has not been attained by the voltage across any one of the HVDC valves, effectively decoupling the normally-applied equidistant-spaced firing pulses and applying the commutating voltage indicating signals for the respective phases to the respective HVDC valves for use as gating-on firing pulses for the HVDC valves in place of the normally-applied equidistant-spaced firing pulses only in response to the occurrence of a minimum valve voltage alarm signal under conditions where asymmetries occur in the A.C. system voltage waveforms due to transient disturbances affecting the system and returning the normally-applied equidistant-spaced firing pulses to control gating-on of the HVDC valves after passage of the transient disturbance and termination of the minimum valve voltage alarm signal.

18. The method according to claim 17 wherein during certain types of A.C. system faults such as a single-phase fault occurring close by the rectifier end of the HVDC transmission system, the zero crossing occurrences of certain phases are delayed and the zero crossing occurrences of other phases are advanced and wherein the firing of the HVDC valves under the control of commutating voltage indicating signals in response to the minimum valve voltage alarm signal assures that none of the HVDC valves are gated-on until the voltage across the respective valve is sufficient to assure safe turn-on and commutation off of a previously conducting valve thereby automatically delaying turn-on of certain of the HVDC valves wherein the zero crossings are delayed and automatically advancing turn-on of other HVDC valves wherein the zero crossings are advanced to thereby maintain maximum power transfer through the HVDC power converter during the transient fault condition.

19. The method according to claim 18 further including delaying application of the commutating voltage indicating signals to the HVDC valve gate devices for a sufficient period to assure that the voltage across the associated HVDC valves has attained a predetermined minimum reference voltage value before firing the respective HVDC valves.

20. The method according to claim 19 further including blocking application of the normal equidistant-spaced firing pulses to the gate drives of the HVDC valves in response to the occurrence of the minimum valve voltage alarm signal and simultaneously allowing only the nonequidistant-spaced commutating voltage indicating signals to be applied to the gate drives for the HVDC valves as gating-on firing pulses during transient fault conditions.

21. The method according to claim 20 further including selectively applying HVDC valve by-pass pair formation gating signals and the like to the respective ones of the HVDC valves in conjunction with either the equidistant-spaced normal gating-on firing pulses or alternatively the nonequidistant-spaced gating-on commutating voltage indicating signals derived from the zero crossings in the presence of a transient fault.

* * * * *